United States Patent

Liptay et al.

Patent Number: 6,035,392
Date of Patent: *Mar. 7, 2000

[54] COMPUTER WITH OPTIMIZING HARDWARE FOR CONDITIONAL HEDGE FETCHING INTO CACHE STORAGE

[75] Inventors: John Stephen Liptay, Rhinebeck; Mark Anthony Check, Hopewell Junction; Barry Watson Krumm, Poughkeepsie; Jennifer Almoradie Navarro, Poughkeepsie; Charles Franklin Webb, Poughkeepsie, all of N.Y.

[73] Assignee: International Business Machines Corporation, Armonk, N.Y.

[*] Notice: This patent is subject to a terminal disclaimer.

[21] Appl. No.: 09/026,923

[22] Filed: Feb. 20, 1998

[51] Int. Cl.[7] .................................................. G06F 9/00
[52] U.S. Cl. .......................... 712/236; 712/233; 712/234; 712/235; 712/236; 712/237; 712/238; 712/239
[58] Field of Search .............................. 710/240; 712/200

[56] References Cited

U.S. PATENT DOCUMENTS

| | | | |
|---|---|---|---|
| 4,991,080 | 2/1991 | Emma | 712/206 |
| 5,303,356 | 4/1994 | Vassiliadis et al. | 712/238 |
| 5,353,419 | 10/1994 | Touch et al. | 712/235 |
| 5,797,020 | 8/1998 | Bonella | 710/240 |
| 5,809,294 | 9/1998 | Ando | 712/233 |

OTHER PUBLICATIONS

"Zero–Cycle Branches in Simple Risc Designs" IBM Technical Disclosure Bulletin, by Grohoski, vol. 33, No. 10B, Mar. 1991, p. 253–259.

"Architecting Computer System Locks" IBM Technical Disclosure Bulletin, by Liu, vol. 30, No. 9, Feb. 1988, p. 444–446.

"High–Speed Translation Mechanism" IBM Technical Disclosure Bulletin, by Weiss, vol. 25, No. 1, Jun. 1982, p. 59–61.

IBM, "Hedge Fetch History Table", IBM Tech. Disclosure Bulletin vol. 31, No. 9, pp. 101–202, Feb. 1989.

Primary Examiner—Richard L Ellis
Assistant Examiner—Stacy Whitmore
Attorney, Agent, or Firm—Lynn L. Augspurger

[57] ABSTRACT

A computer for executing programs and having a structure for fetching instructions and/or operands along a path which may not be taken by a process being executed by a computer processor having a hierarchical memory structure with data being loaded into cache lines of a cache in the structure, and having block line fetch signal selection logic and computational logic with hedge selection logic for generating line fetch block signals for control of hedging by fetching instructions and/or operands along a path which may not be taken by a process being executed and making selected hedge fetches sensitive to whether the data is in the cache so as to gain the best performance advantage with a selected hedge fetch signal which accompanies each fetch request to the cache to identify whether a line should be loaded if it misses the cache to indicate a selected hedge fetch when this signal is ON, and rejecting a fetch request in the event the selected hedge fetch signal is turned ON if the data is not in the cache, the cache will reject the fetch, and thereafter repeating the fetch request after a fetch request has been rejected when the selected hedge fetch signal was turned ON the data was not in the cache to repeat the fetch request at a later time when it is more certain that the process being executed wants the data, or never repeating the request upon determination that the process being executed does not need the data to he fetched.

7 Claims, 4 Drawing Sheets

COMPUTER WITH OPTIMIZING HARDWARE FOR CONDITIONAL HEDGE FETCHING INTO CACHE STORAGE

RELATED APPLICATION

This disclosure is related to the copending application of the same inventors filed at the same time entitled "Method for Conditional Hedge Fetching into Cache Storage". These applications have a common assignee, International Business Machines Corporation, Armonk, N.Y.

1. Field of the Invention

The present invention generally relates to data processors which have caches and which prefetch information from those caches along execution paths before it is known for certain what path instruction processing will follow, in data processors generally, including mainframes as well as data processors suitable for use in personal and notebook computers and work stations, and particularly to conditional hedge fetching into a cache storage of the memory hierarchy of such processors.

2. Background of the Invention

For the past 25 years, most (probably all) computers have performed some operations in anticipation of instruction processing proceeding in certain possible ways. This includes things like prefetching sequential instructions, fetching instructions along alternate branch paths, and decoding, and fetching operands for instructions before it is known for certain whether they will be executed. Any experienced designer could list many such design features. While these features take many forms, each exists to improve performance, and each of them has its own unique set of characteristics.

Also, during the past 25 years, most computer designs have included a cache in their storage system. Caches also have many variations in their designs, but have in common that they keep recently referenced portions of storage in a local array with a fast access time. Most fetches from the processor can be handled quickly with a reference to the local cache, but in the small percentage of cases when it does not have the data, a longer time is required as the data is fetched from main storage (or another level of cache) and loaded into the local cache.

The interaction of these mechanisms is not necessarily a simple one in which the benefits are additive. In particular, consider the interaction of fetching instructions and/or operands along a path which may not be taken (commonly called hedge fetches), and the loading of lines into the cache which may result from those fetches.

Hedge fetches pose a design problem. They can have a significant performance benefit if the processor actually proceeds along that path, because the prefetched data is in the processor ready for immediate usage, and there is no delay while it is fetched. The disadvantage is that a hedge fetch can cause some delay in processing, and if it is not used, that is wasted time. The amount of time used to do a hedge fetch can vary widely. In the best situation, it occurs during a cycle when no other fetch is wanted and the data is in the cache; then there is no penalty. A modest penalty occurs if the data is in the cache, but some other fetch is delayed because of the hedge fetch. In that case the penalty is whatever time is associated with delaying the other fetch, probably a cycle or two. A large penalty occurs if the data is not in the cache, since a cache line fetch makes main storage (or the next level cache) busy for some time, and if data needs to be loaded into the cache this makes the cache busy while the data is being loaded.

Hedge fetches pose a further problem from the cache point of view. Caches work because programs make repeated fetches in the same area of storage, and by loading data in the cache at the first reference to an area this data will be available for subsequent fetches to the same area. If data is brought into the cache which is not needed, performance is degraded both because of the time required to bring it in, and because it replaces other data which may still be needed. So how should hedge fetches be handled? Some hedge fetches to an area will probably be followed soon by fetches to the same area that are really needed and others will not. At the time a hedge fetch is made it is unclear which type it will be and, in general, it is difficult to say what percentage of hedge fetches fall into each category.

The dynamics of these mechanisms is sufficiently complicated that the net effect on performance is not easy to analyze. It will be different in different designs depending on the particular details of each design. It is not possible to generalize that one particular design, or combinations of design features, is the right one always, but following the teaching of the detailed description will improve handling of selected hedge fetches.

SUMMARY OF THE INVENTION

The preferred embodiment of the invention makes the handling of selected hedge fetches in a computer sensitive to whether the data is in the cache and provides a performance advantage. With use of computer hardware the processing of information by the computer now can follow a process whereby a signal accompanies each fetch to the cache to identify whether a line should be loaded if it misses the cache. Selected hedge fetches will have this signal turned on, and if the data is not in the cache, the cache will reject the fetch. Then the processor repeats the fetch at a later time when it is more certain that it wants the data, or it never repeats the fetch because it has determined that it does not want it. Thus, this selected hedge fetching does provide the data if it is in the cache (most of the time), so as to enjoy the benefits of having the data in the processor when needed while at the same time avoiding the large penalty of fetching a line into the cache which might not be needed.

Latches are provided which control which fetches are treated with selected hedge fetches. This makes it possible to try out the system with different combinations of fetches treated this way to determine which performs best.

The hardware for generating block line fetch signals and for determining which paths cause line fetches to be blocked allows implementation of the method in which fetching instructions and/or operands along a path which may not be taken by a process being executed by a computer processor having a hierarchical memory structure with data being loaded into cache lines of a cache in the structure uses a process of making selected hedge fetches sensitive to whether the data is in the cache so as to gain the best performance advantage with a selected hedge fetch signal which accompanies each fetch request to the cache to identify whether a line should be loaded if it misses the cache to indicate a selected hedge fetch when this signal is ON, and rejecting a fetch request in the event the selected hedge fetch signal is turned ON if the data is not in the cache, the cache will reject the fetch, and thereafter repeating the fetch request after a fetch request has been rejected when the selected hedge fetch signal was turned ON the data was not in the cache to repeat the fetch request at a later time when it is more certain that the process being executed wants the data, or never repeating the request upon determination that the process being executed does not need the data to be fetched.

These and other improvements are set forth in the following detailed description. For a better understanding of the invention with advantages and features, refer to the description and to the drawings.

BRIEF DESCRIPTION OF THE DRAWINGS

FIG. 3 shows the logic for controlling whether the block line fetch signal is turned on.

DETAILED DESCRIPTION OF A PREFERRED EMBODIMENT

Figure 1:
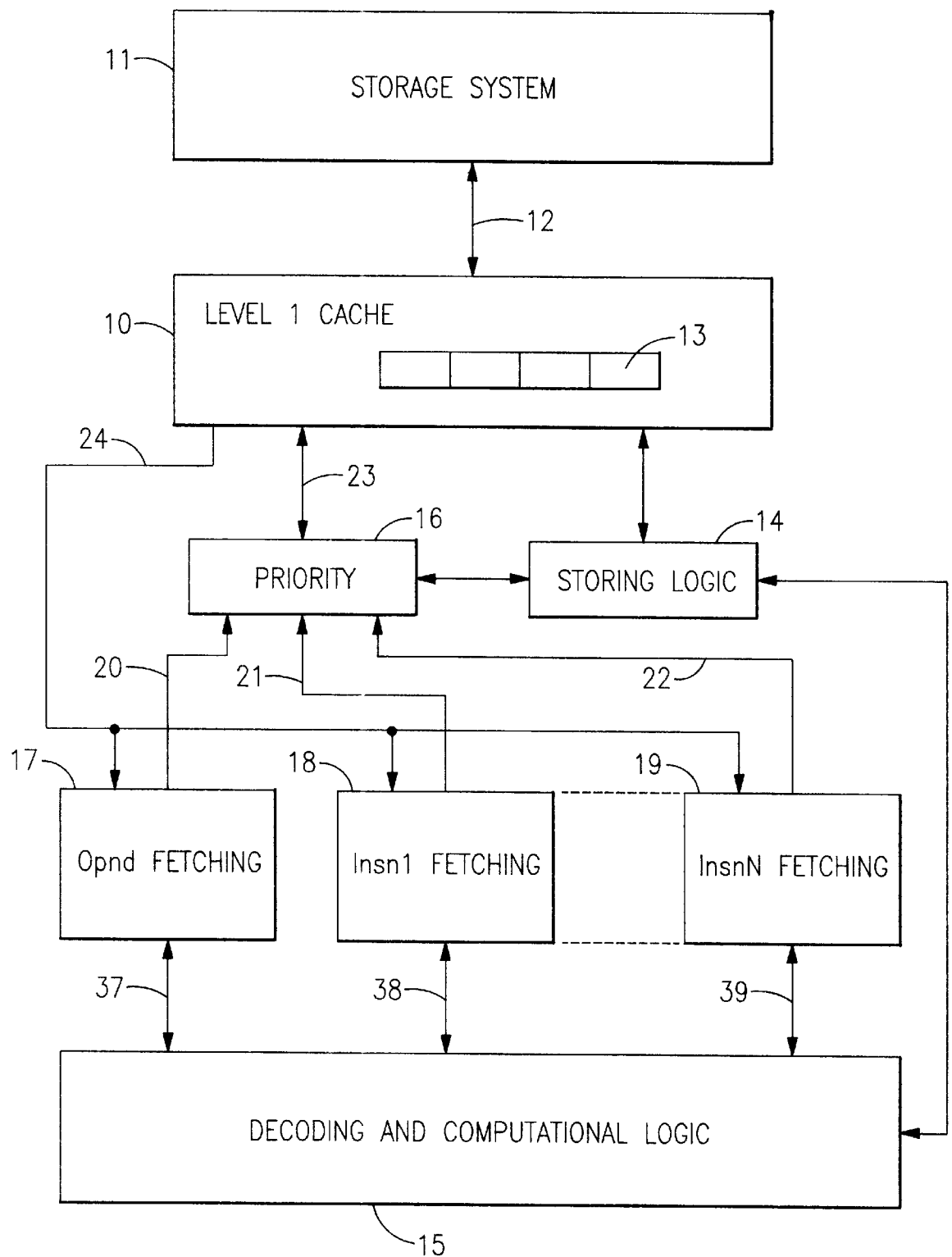
FIG. 1 shows schematically an overview of a prior art processor.

FIG. 1 shows a computer built according to the prior art which will be described first to provide a basis for describing the present invention. It depicts both the computational logic that performs the operations required and the storage connected to that logic.

As is usually the case, the storage consists of a hierarchy with at least one level of cache. The level of cache closest to the computational logic is called the level 1 cache (10) or L1. This cache (10) is connected to a storage system (11) by a number of lines (12) which include all of address, data, and control signals that are needed for communication between the two. The storage system (11) may consist only of the actual storage that serves the system, or may include one or more additional levels of cache storage. This storage system (11) includes both the actual storage circuits that hold the data being stored and also all of the addressing and control logic which is necessary for it to operate. If the system is a multiprocessing system there may be additional processing logic connected to the storage system (11). The details of the structure and operation of this storage system (11) are not relevant to the operation of the present invention which can be used with all significant commercial storage system structures.

The level 1 cache (10) includes a number of lines (13) which hold portions of data from the storage system (11) that have recently been referenced. One of these lines includes not only the data from the storage system, but also the address and any control information needed to recognize and process the data. This level 1 cache (10) may be structured in a number of different ways. It may use a store-through algorithm in which changed data is passed promptly to the storage system (11), or it may use a store-in algorithm in which changed data is kept in the appropriate cache line until that line is removed from the cache, at which time it is sent to the storage system (11). The level 1 cache (10) may include logic for translating virtual addresses to real addresses, and either kind of address may be used to organize the cache. The details of the structure and operation of the level 1 cache (10) are not particularly needed (others could be detailed by reference to other prior art) for the operation of the present invention, except to the extent that the cache brings lines of data into the cache from the storage system (11) in response to requests for data from the processing logic which is common to all caches.

Different elements (14, 15, 16, 17, 18 and 19) which will be discussed below are shown in FIG. 1 and collectively they perform the work of fetching instructions, decoding them, fetching operands, computing results, saving some of them internally, and storing some of them to storage. All of this is done in the decoding and computational logic (15) except for the making of requests to the level 1 cache (10) which is performed by elements (14, 16, 17, 18 and 19) which are separated out and discussed below in order to describe the present preferred embodiment of the invention.

The storing logic (14) includes the data flow, addressing, and control logic needed to pass store data from the decoding and computational logic (15) to the level 1 cache (10), for passing on to storage. It may need to communicate with the priority logic (16) in order to coordinate its communication with level 1 cache (10) with fetches being made. As was stated above, the exact method of processing stores is not of particular importance to this invention, and so this store logic (14) represents whatever is necessary to process stores, without regard to the details thereof. It is included mainly for completeness of the overall diagram.

In this preferred embodiment, the computer follows a single path through the instruction stream for decoding and processing instructions, based on its judgement about which way branches will proceed. That judgement is based on both examination of each branch when it is decoded, and history information which may be found in a branch history table related to that branch. In following this path, the computer makes both instruction fetches and operand fetches.

Elements (17, 18 and 19) represent the logic which makes fetches for both instructions and operands on behalf of the decoding and computational logic (15). Each of these elements (17, 18 and 19) include both the necessary data flow and control logic needed for their function. They operate largely independently of one another, and therefore a set of priority logic (16) is provided which selects which of several competing requests is sent to the level 1 cache (10). They are connected to the decoding and computational logic (15) by a set of signals (37, 38 and 39) which provide them with the needed overall control, for such things as starting, stopping, status, and knowing when portions of data have been used.

The operand fetching element (17) represents the logic which makes operand fetches on behalf of the decoding and computational logic (15) along the main path being followed by decoding. Because this is the only path along which operand fetches are made, they are not an object of the present invention, but one could imagine an implementation in which it would be appropriate to have the present invention apply to operand fetches.

The instruction 1 fetching element (18) and the instruction N fetching element (19) are representative of a number of elements which each fetch instructions along a single path of sequential addresses. These include instruction fetches along the main path being followed by the computer, and also hedge fetches along other paths. In the preferred embodiment there are two types of such hedge fetches. The first type are fetches made along instruction paths that the computer did not chose to follow for decoding. That is, continued sequential fetches beyond a branch which is expected to be taken, and, secondly, fetches at the target address of a branch which is not expected to be taken. The second type are instruction fetches made at locations to which the branch history table predicts branches will go. These fetches will become part of the main path when decoding reaches the branch, if the predicted branch is in the instruction stream, but until then they are treated as hedge fetches. During processing, one of the instruction fetching elements (18, 19) is assigned to a particular path, and remains assigned to that path until the processor no longer needs it; that is, it may at one time be a hedge path and at another time be part of the main path. For example, it may be started based on a prediction by the branch history table, at which time it is a hedge path, but then, after the branch has been decoded and processing changes to the instructions it fetched, it becomes the main path.

The signals (20, 21 and 22) from the fetching elements (17, 18 and 19) to the priority logic (16) include a request signal which indicates that a request is wanted, various signals which qualify the request in one way or another, and the address for the fetch. The priority logic (16) determines which request is to be sent (23) to the level 1 cache (10), and signals back to requesting element using (20, 21 or 22) that it has been sent. The level 1 cache (10) then processes the request and responds using signals (24) which include both a data bus for the return of data, and appropriate control signals. In the preferred embodiment, the return signals from the level 1 cache (10) to the fetching elements (17, 18 and 19) go over a common bus, but that is not an essential element of the present invention. This information could equally well be transmitted using unique signals to each of the fetching elements (17, 18 and 19), or over a combination of individual and common signals.

There are three possible outcomes for a request. The first is that the data is in the level 1 cache (10) and is returned at a fixed time after the request was made.

The second possible outcome is that the data is not in the level 1 cache (10) and the cache starts a fetch for the needed line from the storage system (11). As soon as it knows that the data is not in the cache the level 1 cache (10) signals over (24) that it has started a line fetch and that the data will be delayed. Then, at a later time, the data is returned over (24) along with a control signal that it is the data which was delayed. The fetching elements (17, 18 and 19) understand this protocol and wait until the delayed data is returned.

The third possible outcome is that the data is not in the level 1 cache (10), but that the level 1 cache (10) is already busy fetching a line in response to an earlier request. In this case, the level 1 cache (10) signals that the request has been rejected, in which case the fetching element (17, 18 or 19) needs to repeat the fetch at a later time.

The logic described thus far has been used before in IBM commercial machines. However, in connection with the preferred embodiment, we now consider FIG. 2 which incorporates all of the elements described thus far, and in addition the elements which are included in the preferred embodiment of the present invention.

It will be noted first that there are signals (41 and 42) added from the instruction fetching elements (18 and 19) to the priority logic (16), and there is a signal (43) added from the priority logic (16) to the level 1 cache (10). These are known as block line fetch signals. When one of the instruction fetching elements (18 or 19) is making a request, and is operating along a hedge fetching path for which cache line fetches are not to be performed, it turns on its block line fetch signal (41 or 42) along with the request. When the priority logic selects a request to send to the level 1 cache (10) from one of the instruction fetching elements (18 or 19), if its block line fetch signal (41 or 42) is on, then the block line fetch signal (43) to the level 1 cache (10) is turned on. This changes the way that the level 1 cache (10) processes the request. If the requested data is in the cache, it is returned in the normal manner. However, if it is not in the level 1 cache (10), it does not start a line fetch, but rather rejects the fetch using the normal signals (24) which were described above. This makes it necessary for the instruction fetching element (18 or 19) to repeat the request.

Figure 2:
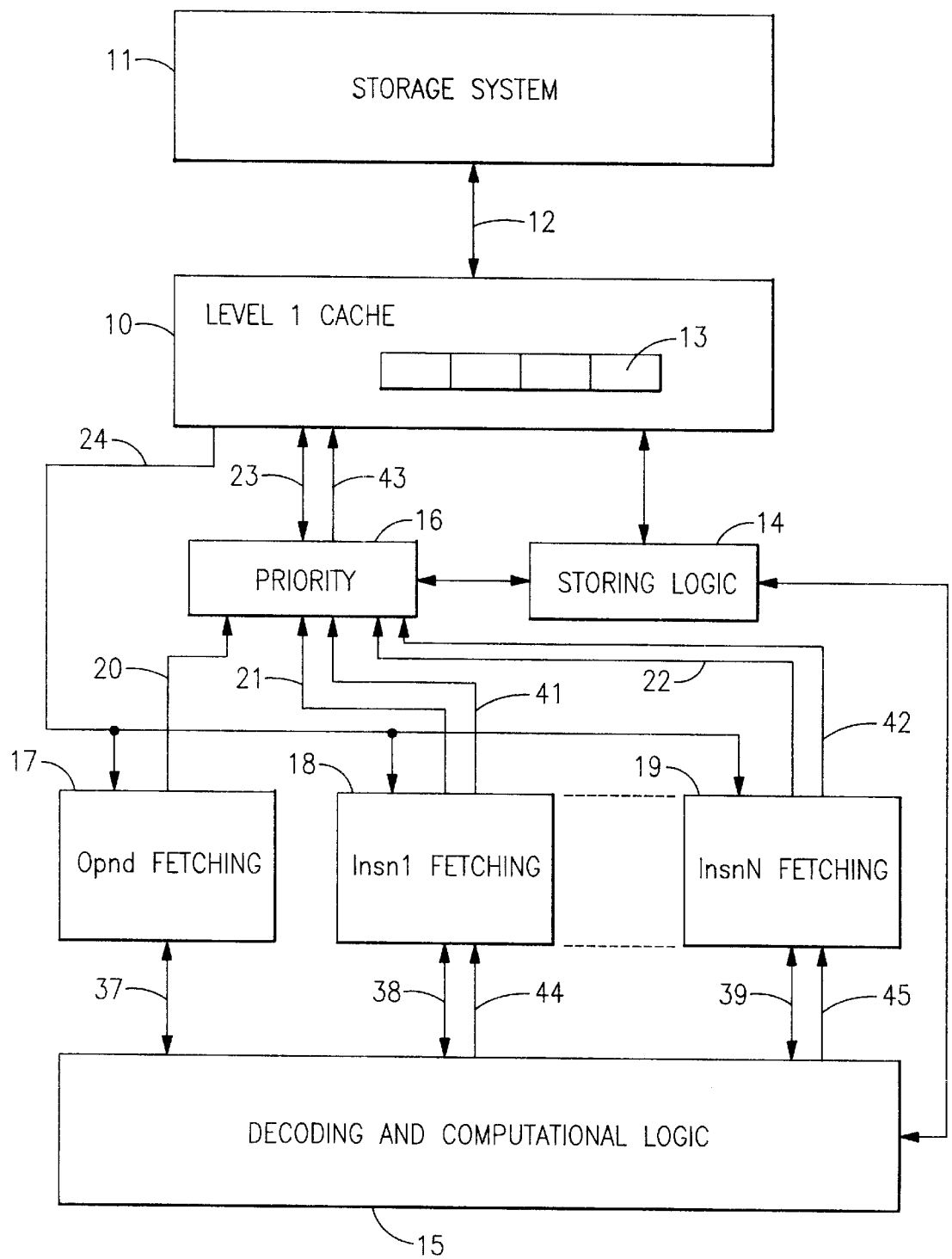
FIG. 2 shows the same processor as in FIG. 1, but with this invention added.

It will be noted further that in FIG. 2 there are additional signals (44 and 45) from the decoding and computational logic (15) to each of the instruction fetching elements (18 and 19). These signals inform each of the instruction fetching elements (18 and 19) whether it is operating along a path where line fetches should be blocked, and control whether the above actions of the block line fetch signals (41, 42 and 43) take place. Also, as was noted above, whether a particular instruction fetching element (18 or 19) is operating along such a path changes as processing proceeds.

Figure 3:
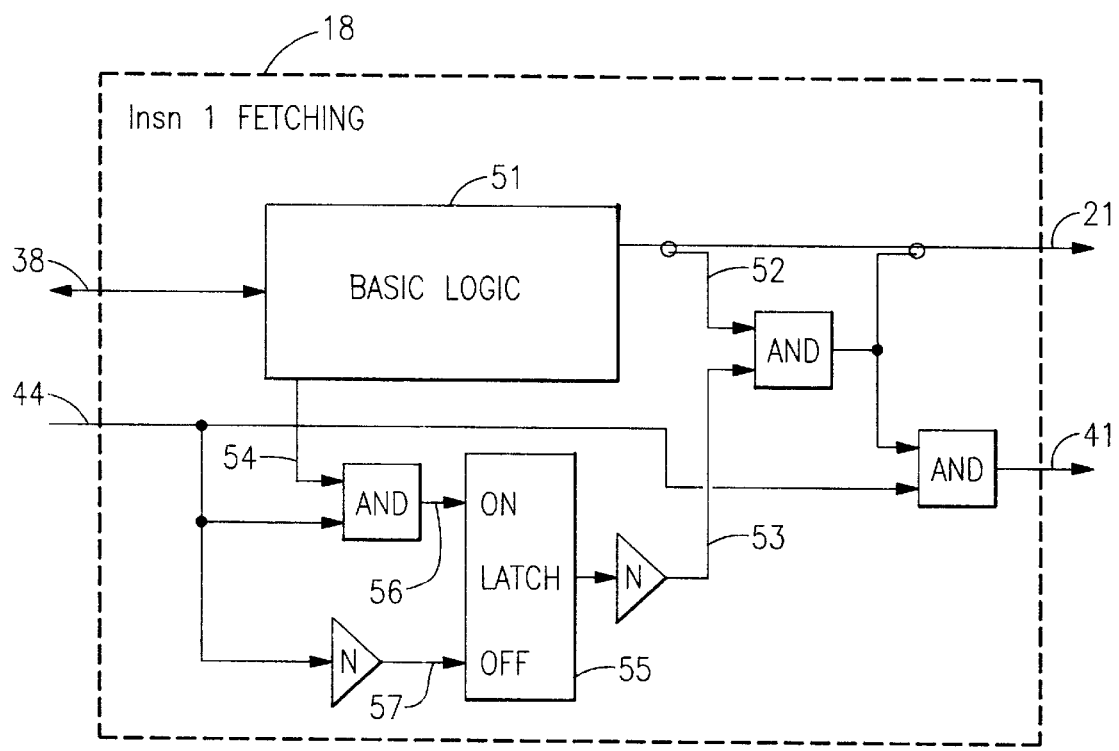

Next examine FIG. 3 which shows the detail of the logic added to the instruction 1 fetching element (18) which is representative of the logic added to all of the instruction fetching elements. The basic logic (51) is the logic which is needed for the prior art implementation shown in FIG. 1, and the remaining logic is what is added by the present invention. Within the group of signals (21) sent to the priority logic is a request signal (52) which tells the priority logic (16) that this instruction fetching element (18) wants to make a request. This signal is separated from the group of signals (21), ANDed with another signal (53), and then rejoins the group of signals (21). It also ANDs with the signal (44), described previously, which informs these controls that they are on a path where line fetches should be blocked, to form the block line fetch signal (41) to the priority logic (16).

The latch (55) in FIG. 3 has two input signals (56 and 57) which respectively turn it ON and OFF. The signal (54) comes ON when the first fetch has been processed by the level 1 cache (10), and is ANDed with the line fetch blocking signal (44) to create the signal (56) which turns the latch ON. The basic logic (51) knows this by examining the signals (38) it receives from the level 1 cache (10). Thus, when the first request that is not allowed to cause a line fetch is processed by the level 1 cache (10), the latch (55) is turned ON, the signal (53) goes OFF, and further fetch requests are blocked. This latch remains ON until the line fetch blocking signal (44) is turned OFF, and the latch reset signal (57) turns the latch OFF.

Figure 4:
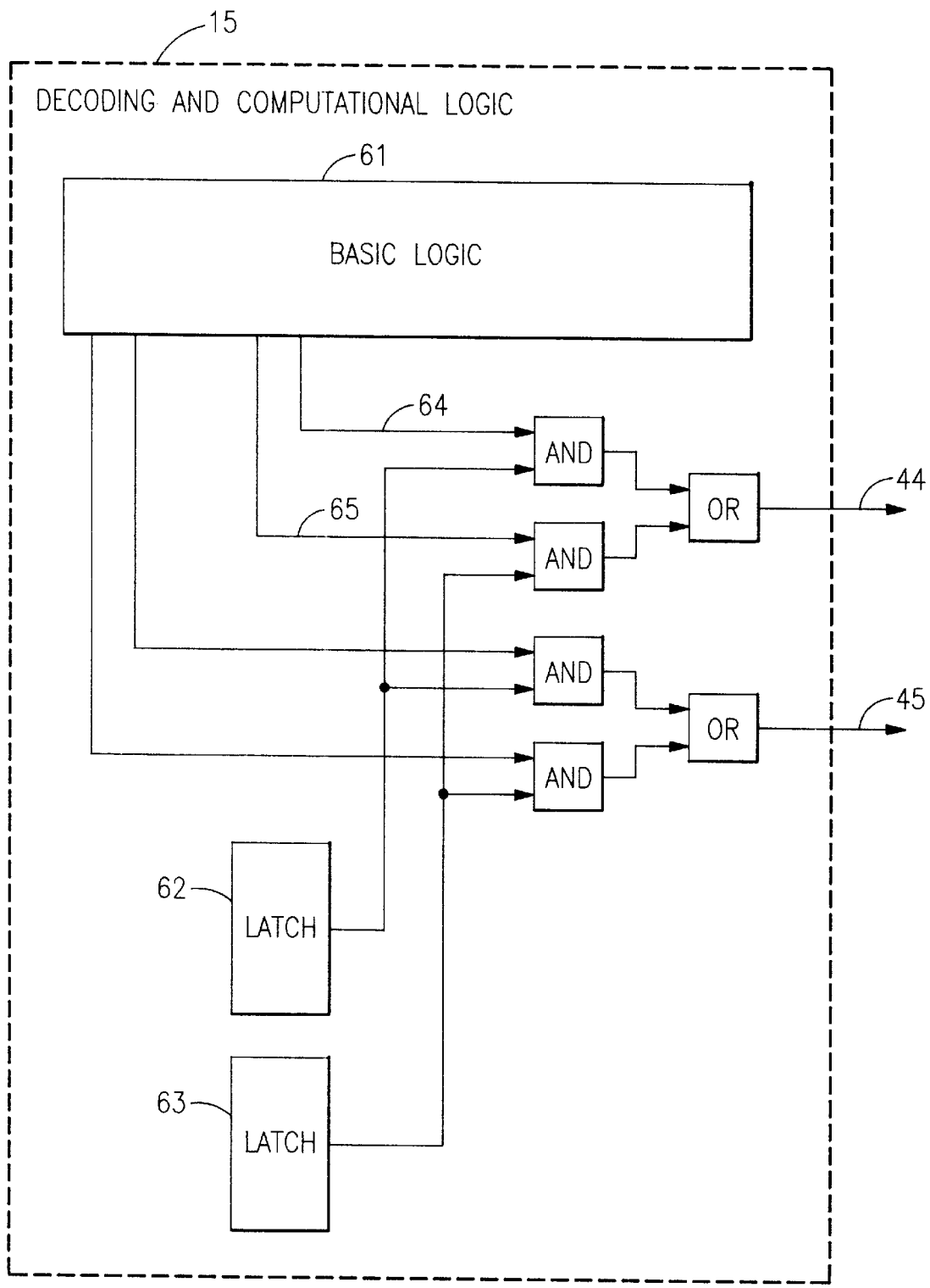
FIG. 4 shows the logic for determining which paths cause line fetches to be blocked.

FIG. 4 shows the logic within the decoding and computational logic (15) that has been added by the present invention. The basic logic (61) is the logic which is needed without the present invention. The remaining logic is for the purpose of generating the signals (44 and 45) required for the present selected hedge fetching and this logic informs the instruction fetching elements (18 and 19) that they should cause line fetching to be blocked for their requests.

There are two latches (62 and 63) which correspond respectively to blocking line fetches for paths the computer did not chose to follow and to blocking line fetches for paths predicted by the branch history table. These latches are set when the processor is initialized, and each may be either ON or OFF depending on how it is desired to have the processor operate. The processor can then be run with these latches (62 and 63) in different states to control how hedge fetches are handled so as the determine the optimum performance mode for the processor. If the processor is run with both latches turned OFF, then its operation is the same as the prior art design.

There are also two signals (64 and 65) generated by the basic logic (61) which report respectively whether the instruction 1 fetching element (18) is fetching along a path the computer did not chose to follow (64), or is fetching along a path predicted by the branch history table (65). The logic shown causes signal (44) to come ON if the instruction 1 fetching element (18) is operating along a path for which the corresponding latch (62 or 63) is set to indicate that cache line fetches should he blocked. The logic for generating signal (45) is the same.

In summary, for example, if the latch (62) indicating the line fetches are not be made for paths not followed is ON, and instruction 1 fetching element (18) is started for such a path, then signal (64) will be ON which will cause signal

(44) to be ON. The instruction 1 fetching element (18) starts in a normal manner but has signal (41) ON to accompany its request. Because of that, if the data is not in the level 1 cache (10), the request will be rejected and the latch (55) will be turned ON to prevent any further fetch requests. If it is determined by the decoding and computational logic (15) that this data is not needed then the instruction 1 fetching element (18) will be reset without making any further requests. On the other hand, if the data is really needed, then in due course the signal (64) will go OFF which will cause signal (44) to go OFF, which will allow the instruction 1 fetching element (18) to send a fetch request to the level 1 cache (10), this time without signal (41) ON. Thus, this time the cache will cause the needed line to be loaded and will return the needed data.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A computer for executing programs and having a structure for fetching instructions and/or operands along a path which may not be taken by a process being executed by a computer processor having a hierarchical memory structure with data being loaded into cache lines of a cache in the structure, said computer comprising: a central processor with processing logic, a hierarchical memory structure including at least a first level of cache organized to bring lines of data into the cache from the memory structure in response to requests for data from the processing logic, decoding and computational logic for fetching instructions, decoding instructions, fetching operands, computing results, saving results computed internally, storing results to storage, and storing logic elements for processing stores to said first level cache including storing logic for passing store data from said decoding and computational logic to the first level cache and for passing said store data on to other storage, operational logic for making fetches for both instructions and operands on behalf of the decoding and computational logic including: (a) a operand fetching element which makes operand fetches on behalf of said decoding and computational logic along a main path being followed by a decoding process of a computation being performed in accordance with a program being executed with said structure, and (b) a plurality of instruction fetching elements which each fetch instructions along a single path of sequential addresses including sequential addresses identified during said decoding process as being along said main path, and in addition, instructions fetches along other paths including fetches that the computer did not choose to follow for decoding and instruction fetches at a target address of a branch which is not expected to be taken but to which a branch history table predicts branches will go; priority logic for receiving a requests sent from said operational logic as output signals, which requests include a request signal which indicates that a request is wanted, signals which qualify a request, and the address for a fetch; said priority logic determining which request is to be sent to the first level cache, and signals back to a requesting operational logic element that it has been sent; said first level cache then processing and responding to the request by indicating that either: (i) the data is in the first level cache, (ii) the data is not in the first level cache, or (iii) the request is rejected as the first level cache is busy; said plurality of instruction fetching elements having a coupling to said priority logic for returning to said priority logic block line signals causing said priority logic to send to said first level cache a block line fetch signal, wherein when an instruction fetching element is making a request and is operating along a hedge fetching path for which cache line fetches are not to be performed it turns on its block line fetch signal along with the request, and when said priority logic selects a request to send to said first level cache from one of said instructions fetching elements, if it has an on block line signal, it provides a signal for turning on the block line signal to the first level cache to change the first level cache processing of the request; said decoding and computational logic providing to each of said instruction fetching elements signals which inform whether the instruction fetching element is operating along a path where line fetches should be blocked and which control whether block line fetch signals actions take place to determine which paths cause line fetches to be blocked, and wherein the determination of which fetches are marked by a selected hedge fetch signal which accompanies each fetch request to the cache to identify whether a line should be loaded if it misses the cache to indicate a selected hedge fetch when this signal is ON, is determined by the setting of latches which control which fetches are so treated, and the determination of which latches are set is determined by testing combinations of fetches treated this way to determine which performs best.

2. A computer according to claim 1 including block line fetch signal logic for controlling whether a block line fetch signal is turned on, and providing within a group of signals sent to the priority logic a request telling the priority logic that the instruction fetch element wants to make a next request, said next request signal being separated from said group of signals and being ANDed with logic with another signal before rejoining said group of signals, said block line fetch signal selection logic also ANDing with a line fetch block signal indicating that line fetches should be blocked to cause said block line fetch signal to be sent to said priority logic.

3. A computer according to claim 2 wherein said computer has block line fetch signal logic includes a block line fetch signal control latch having two input signals which respectively turn it ON and OFF, and wherein said latch signal comes ON when the first fetch has been processed by the first level cache, and is ANDed with the line fetch blocking signal to create the latch input signal which turns the latch ON.

4. A computer of claim 3 wherein said block line fetch signal control latch is ON upon evaluation of signals the basic logic receives from the first level cache, and when the first request that is not allowed to cause a line fetch is processed by the first level cache, the block line fetch signal control latch is turned ON, and when the block line fetch signal latch output signal goes OFF further fetch requests are blocked, said latch remaining ON until the line fetch blocking signal is turned OFF, and a latch reset signal turns the latch OFF.

5. A computer of claim 4 wherein said decoding and computational logic has added hedge selection logic for generating the line fetch block signals and for determining which paths cause line fetches to be blocked including two hedge latches for respectively (A) blocking line fetches for paths the computer did not chose to follow and(B) blocking line fetches for paths predicted by the branch history table, said two hedge latches being set when the computer is initialized, and each may be either ON or OFF depending on how it is desired to have the computer operate, said computer running with said hedge latches in different states to control how hedge fetches are handled so as the determine the optimum performance mode for the processor.

6. A computer of claim 5 wherein basic logic generates also two signals which report respectively whether an instruction fetching element is fetching along a path the computer did not chose to follow, or is fetching along a path predicted by the branch history table, whereby a line fetch blocking signal comes ON if the instruction fetching element is operating along a path for which the corresponding hedge latch is set to indicate that cache line fetches should be blocked.

7. A computer of claim 6 wherein if a hedge latch indicating the line fetches are not be made for paths not followed is ON, and an instruction fetching element is started for such a path, then a line fetch blocking signal comes ON, and when an instruction fetching element has a block line fetch signal ON to accompany its request, if the data requested is not in the first level cache, the request will be rejected and the block line fetch signal control latch will be turned ON to prevent any further fetch requests, and if the decoding and computational logic determines that the requested data is not needed then the instruction fetching element will be reset without making any further requests, but wherein on the other hand, if the data is really needed, then in due course the block line fetch signal will go OFF and thus allow the instruction fetching element to send a fetch request to the first level cache.

* * * * *